United States Patent Office 2,875,160
Patented Feb. 24, 1959

2,875,160

SYNTHETIC RESIN CAPABLE FOR BINDING ORGANIC ATOM COMPLEXES AND PROCESS FOR PREPARING SAME

Leonard Jan Kantebeen, Amsterdam, Netherlands, assignor to N. V. Centrale Suiker Maatschappij, Amsterdam, Netherlands, a company of the Netherlands No Drawing. Application February 15, 1954
Serial No. 410,449

Claims priority, application Netherlands
February 16, 1950

6 Claims. (Cl. 260—2.1)

This is a continuation in part of my U. S. application Ser. No. 210,621, filed February 12, 1951, now abandoned.

It is known that condensation products of suitable organic compounds and aldehydes are ion-exchanging substances; they are called synthetic resins. After their preparation they are generally dried in order to make the weight per litre, and consequently the exchange capacity per litre of resin, as high as possible. These products have no or practically no decolourising properties.

If it is desired to produce decolourising resins (also known by the name of resin gels) from such components, according to the literature the components should be condensed in a highly dilute solution, while the resins formed may be freed from moisture to such a slight extent only that a litre of the granular resin contains at most 400 g. of dry material; however, these resins are preferably not dried at all. Owing to the method of preparation these resins are very porous and have only a comparatively low mechanical strength. These resins should be kept under water. They have substantially no ion-exchanging properties. In many cases these resins exhibit objectionably intense swelling and shrinking during their successive regenerations with alkali and acid.

The decolourising effect of the resins described in the preceding paragraph is ascribed to the presence of capillary tubes (pores). The pores required for the decolourisation are thought to be formed as a result of the condensation of the components in a highly dilute solution, and they are presumed to be preserved by the prevention of desiccation. If these resins are dried, the pores are thought to close. At any rate the decolourising effect is then substantially or largely destroyed; this effect is not restored, if a resin that has been dried is moistened again. In the above, the decolourising effect has only been referred to as an example of the properties of the resins of this type; it also applies in general to the adsorption capacity of these resins for comparatively large organic atom complexes, such as perfuming, flavouring, and colouring substances, alkaloids, etc.

According to the prevalent views, the concentration of the reactants therefore determined the type of resin formed in the reaction. If a given proportion of the reaction components was taken, an ion exchanger was obtained (after drying) with relatively little water in the reacting mixture, while an adsorbent resin (in the above sense) was obtained with a relatively large amount of water.

The inventor has thoroughly investigated the known resins on the basis of metaphenylene diamine or of a mixture of metaphenylene diamine and other substances known for use in this condensation, both as ion exchangers and decolourising resins. He found that when these known resins are dried, the volume in the dry condition is never more than 22% and almost always 20–15% or even less of the volume of the resin in its granular and non-dried condition, immediately after preparation. If the resin originally had decolourising properties, these are substantially or entirely lost during the drying.

He further made the striking discovery that resins are obtained, which are eminently suitable for binding organic atom complexes, in particular colouring substances, these resins being hereinafter termed decolourising resins, by condensing metaphenylene diamine in the presence of nitric acid with formaldehyde, in an aqueous medium, when the volume of the granular resin dried until the weight is constant is at least 25% and preferably 30–70% of the volume of the freshly condensed resin in its granular and non-dried condition.

The manner in which the volumes are determined is the following:

Freshly condensed and non-dried resin is ground and sifted while wet, preferably in a stream of water. After this, a graduated tube is partly filled with water and the granular product obtained as described is introduced into this tube, care being taken that the resin always remains below the surface of the water. The tube is subsequently tapped on the table until the volume of the resin, which has settled in the water does not decrease any more. As soon as the surface of the resin is horizontal, the volume of the resin is read. The resin is then removed quantitatively from the tube and dried until the weight is constant (the volume then decreases no more). The dried resin is then transferred to a dry graduated tube and tapped on the table in the manner referred to above. After this, the volume is read again. This last volume, according to the invention, should be at least 25% of the volume first read while the resin was still wet. If this volume ratio should be less than about 25%, the resin may have ion-exchanging properties after the drying; in that case it is not a satisfactory adsorption resin.

The ratio of the volumes of the resins in the dry and the wet condition will be referred to hereinafter as the percentage of the volume of the dry resin as compared with that of the wet resin, determined in the manner described above.

The determining factors in the condensation are the amounts of formaldehyde, nitric acid and water used per mole of m-phenylene diamine with which the formaldehyde is condensed; it has been found that they can be (and consequently that they should be) so chosen that the volume ratio identified above is obtained. There was found to be a certain minimum both for the nitric acid and for the formaldehyde. If the quantities used in the condensation remain below these minima, the resins obtained are not good decolourising resins. If the quantities used are above the minima referred to, but below the maximum for the acid, good to excellent decolourising resins are obtained, which have hardly any ion-exchanging properties or none at all. When the minimum and maximum quantities of nitric acid and the minimum quantity of formaldehyde required for the invention are not exceeded, the abovementioned volume ratio of about 25% is therefore found; no upper limit for the formaldehyde has been found.

If larger quantities of acid are used than the maximum quantity the resin obtained will again fall outside the range of the decolourising resins to be prepared according to the invention.

The quantity of water also plays a part. In general it can be said that the quantity of water should be at least sufficient for the components to be properly mixed prior to any considerable formation of resin. This condition determines the minimum quantity of water. When the maximum water content is exceeded the resin obtained will no longer have any satisfactory decolourising properties; the volume ratio will then also have fallen below about 25%.

Instead of in water the condensation can also be caused to take place in an aqueous alcoholic medium, but this will needlessly increase the cost of the resins.

It is thus evident that it is advisable to determine the optimum proportions of the components of the mixture, in connection with the initial materials chosen, by a few preliminary tests. This is done by measuring each time, in the manner indicated above, the volume ratio of the wet and dry resin.

On the basis of 1 gram mol. of m-phenylene diamine, the limits found, expressed in gram molecules, were approximately as follows: $HNO_3$ 1.3–4.7, formaldehyde >2.3.

The maximum quantity of water in the condensation mixture should be 65 moles; the quantity used is preferably less than 51 moles of water.

Although in the above the invention has always been defined with the aid of the volume of the dried resin, it is explicitly stated here that the resins prepared according to the invention need not be dried before use. The thermal drying is, however, to be recommended for several reasons, for example with a view to transport. Considering the prior art it is a very remarkable feature that the decolourising properties of the new resins are not lost by thermal drying and are not even impaired by it to any appreciable extent. It is also noteworthy that, in contrast with the known resins, the new resins regain substantially their original capacity after regeneration, even after repeated regenerations.

The resins according to the invention are preferably thermally dried until the weight is constant, so as to make the mechanical strength as great as possible. The drying may take place at widely differing temperatures, for example between 80° and 100°. If the drying temperature is too high resins are obtained which have less affinity for organic atom complexes than those which have been dried at lower temperatures (without decomposition). With the satisfactory decolourising resins according to the invention the ion-exchanging capacity is very slight or entirely absent. If some slight ion exchange should be found to occur at first, this will practically disappear after prolonged use.

The production of the resin is carried out as follows:

The metaphenylenediamine is added to the water; then the nitric acid is added. All reactants are at room temperature. By the mixing of the metaphenylene diamine, the water and the acid the temperature rises to about 30° C. The mixture is heated to about 50° C. under stirring till all the m-phenylene diamine has dissolved. After the solution is cooled down to a temperature of about 25 to 30° C. all the formaline is added very quickly in one step under vigorous stirring.

The temperature rises very rapidly to about 75–80° C. if small quantities are used and to about 90 to 100° C. with large quantities of the reactants. This temperature is attained in about 7 to 10 minutes. About 1½ minutes after the addition of the formaline the reaction mixture solidifies. At this moment the temperature has not yet attained the maximum value. The reaction takes place without cooling.

The reaction mixture is left till the temperature has fallen sufficiently to enable the further treatment. If large quantities of the reactants are used the period takes about 12 to 16 hours. Then the solid mass is removed from the container and ground under water. The resin is thermally dried at a temperature under 100° C.

The resins according to the invention can be used for the adsorption of organic atom complexes from aqueous solutions, such as colouring, scenting and flavouring substances. If the substances thus removed from the solutions have sufficient value, they can be recovered from the resin, for example by elution.

The new resins are particularly important for the decolourisation of aqueous solutions containing sugars, for example saccharose or glucose.

The regeneration of the resins is effected in known manner, with the aid of bases and acids.

The above will now be explained with reference to a number of examples. Since the condensation itself is carried out in the manner described above only the figures have been listed in the table, for the sake of brevity. All the tests were carried out with ½ mole of m-phenylene diamine when not indicated otherwise. All the quantities are given in moles. The quantity of water is the total quantity present, i. e. that originating from the acid and the aldehyde, and the water added.

TABLE

| m-phenylene diamine | $HNO_3$ | formaldehyde | Water | vol. ratio in percent |
|---|---|---|---|---|
| 0.5 | 0.73 | 1.40 | 31.5 | 26 |
| 0.5 | 0.65 | 1.40 | 16 | 40 |
| 0.5 | 0.73 | 1.40 | 16 | 43 |
| 0.5 | 0.79 | 1.40 | 16 | 45 |
| 0.5 | 0.73 | 1.40 | 6 | 49 |
| 0.5 | 1.11 | 1.40 | 16 | 53 |
| 0.5 | 2.37 | 1.40 | 16 | 25 |

The resins mentioned in the above table were found to have adsorption (decolourising) properties also after drying, these properties in general being the more marked as the indicated vol. ratio is higher.

If the volume ratio is below 25 the adsorbent capacity of the resins is too slight to justify their being called adsorption resins, properly speaking. When the volume ratio is less than 20, the resins have practically no adsorption (decolourising) capacity left; they are then (after drying) typical ion exchangers.

A number of examples will serve to illustrate the difference even more clearly.

*Example I*

50 g. of metaphenylene diamine were dissolved with 50 cm.$^3$ of $HNO_3$ (50%) in 150 cm.$^3$ of water and condensed with 100 cm.$^3$ of formaldehyde (35%). The mixture of metaphenylene diamine, water and nitric acid is heated under stirring to 50° C. till all metaphenylene diamine has dissolved. After cooling this solution to 25° C. 100 cm.$^3$ formaline are added quickly with vigorous stirring. The temperature rises to a maximum of about 75° C.; at a temperature of 50° C., about ½ m. after the addition of the formaline the reaction mixture solidifies already. The product was ground, washed, sifted, and dried at 100° C. until the weight was constant. The volume ratio was 17.8%.

At the same time a second sample was prepared by dissolving 50 g. of metaphenylene diamine with 65 cm.$^3$ of $HNO_3$ (50%) in 150 cm.$^3$ of water and condensing with 100 cm.$^3$ of formaldehyde (35%). The temperature rises to about 75° C.; about ½ minute after the addition of the formaline the whole reaction mixture is solidified. The product was ground, washed, sifted and dried at 100° C. until the weight was constant. The volume ratio was 43%.

The two perfectly dry resins were moistened in water; equal volumes of the two wet resins were introduced into tubes. After the resins had been treated with alkali and acid, and had been thoroughly washed, samples of the same syrup from sugar refining with a colour of 433.8 per 100 g. of dry substance (Lovibond tinto-meter) were percolated through the two resins. The first resin was found to eliminate 26.53% and the second resin 98.53% of the colour.

*Example II*

A dilute aqueous solution of n-propyloxy-1-amino-2-nitro-4-benzene was passed over the resin of Example I (volume ratio 43%). This compound was completely adsorbed by the resin, while water flowed off from the filter. The substance in question could easily be eluted from the resin with the aid of an organic solvent, for example benzene or ether.

The volume ratio of some of the resins from the prior art was also determined. All these resins are produced in the presence of hydrochloric acid. The results are listed in the following table; the figures again refer to gram molecules.

TABLE

|  | m-phenylene | HCl | formaldehyde | water | vol. ratio in percent |
|---|---|---|---|---|---|
| U. S. Pat. 2,106,486 | 0.5 | 1.71 | 1.44 | 39 | 17 |
| U. S. Pat. 2,290,345 | 0.5 | 0.73 | 0.78 | 18 | 14.3 |
| U. S. Pat. 2,261,021 | 0.5 | 0.52 | 1.08 | 13.6 | 15 |
| Fr. Pat. 875,743, 1st example | 0.5 | 0.38 | 1.35 | 16.5 | 20.8 |

What I claim is:

1. A process for the production of decolourising resins, capable of being dried thermally without loss of their decolourising properties, which comprises condensing 1 mol of meta-phenylene diamine with at least 2.3 mols of formaldehyde, from 1.3–4.7 mols of nitric acid and a quantity of water, sufficient to permit the reactants to be properly mixed, amounting to from about 12 to not greater than 65 mols, cooling the resulting solid mass and grinding it under water.

2. A process as defined in claim 1, in which the water content of the reaction mixture is not more than 51 mols.

3. A synthetic resin having decolourising properties, said resin, when dried to constant weight, having a volume of at least 25% of the freshly prepared and undried resin and being capable of being dried thermally without loss of its decolourising properties, said resin being the product of the condensation of 1 mol of meta-phenylene diamine with at least 2.3 mols of formaldehyde in the presence of from 1.3 to 4.7 mols of nitric acid and an amount of water sufficient to permit the reactants to be properly mixed and amounting to from 12 to not greater than 65 mols and grinding under water.

4. A synthetic resin having decolourising properties, said resin, when dried to constant weight, having a volume of at least 25% of the freshly prepared and undried resin and being capable of being dried thermally without loss of its decolourising properties, said resin being the product of the condensation of 1 mol of meta-phenylene diamine with at least 2.3 mols of formaldehyde in the presence of from 1.3 to 4.7 mols of nitric acid and a water content of the reaction mixture of from about 32 to not more than 51 mols and grinding under water.

5. Process as defined in claim 1 in which the ground resin is dried at about 100° C.

6. Synthetic resin as defined in claim 3 in which the ground resin is dried at about 100° C.

References Cited in the file of this patent

UNITED STATES PATENTS

| 2,106,486 | Kirkpatrick | Jan. 25, 1938 |
| 2,272,873 | Kistler | Feb. 10, 1942 |
| 2,272,876 | Kistler | Feb. 10, 1942 |
| 2,671,059 | Smit | Mar. 2, 1954 |

FOREIGN PATENTS

| 450,309 | Great Britain | Sept. 26, 1935 |
| 876,930 | France | Aug. 24, 1942 |